3,560,450
Patented Feb. 2, 1971

3,560,450
LACTONE POLYMERIZATION PROCESS WITH PARTICULATE INITIATOR
Dario P. Curotti, Amsterdam, Netherlands, assignor to Shell Oil Company, New York, N.Y., a corporation of Delaware
No Drawing. Filed Dec. 23, 1968, Ser. No. 786,444
Int. Cl. C08g *17/017*
U.S. Cl. 260—78.3
4 Claims

ABSTRACT OF THE DISCLOSURE

An improved process for the slurry polymerization of one or more $\beta$-propiolactones, at least 50% mole being pivalolactone, in a liquid hydrocarbon diluent in the presence of a solid carboxylate anion containing initiator which is either a preformed betaine or a "living" prepolymer, at least 80% by weight of the initiator possessing a particle size between 5 and 200 microns.

---

The invention relates to a process for the polymerization of one or more $\beta$-propiolactones, at least 50% mole thereof being pivalolactone, in a liquid hydrocarbon diluent, more particularly to the homopolymerization of pivalolactone ($\alpha,\alpha$-dimethyl-$\beta$-propiolactone) in a slurry-type process, as well as to the polyesters thus obtained.

As used herein, "slurry polymerization" refers to a process in which under the polymerization conditions the monomeric lactone is at least partly soluble in the liquid diluent, i.e., to an amount of more than 10% by weight. The resulting polymeric lactone is substantially insoluble, i.e., soluble to an extent of not more than 1% by weight, causing its precipitation in and the "slurriness" of the polymerization mixture. Such slurry polymerization will occur if, for example, a low-boiling hydrocarbon, such as heptane, is used as diluent.

An advantageous method of carrying out this type of polymerization has been claimed in copending U.S. patent application No. 717,394, filed Mar. 29, 1968. According to said method the polymerization of one or more $\beta$-propiolactones, at least 50% mole of these being pivalolactone, is effected in a liquid hydrocarbon diluent having a boiling point of below 300° C. in the presence of a solid carboxylate anion-containing initiator which is substantially insoluble in the diluent, is free of active hydrogen and is either (A) a betaine having a molecular weight of below 10,000 or (B) a "living" prepolymer which may or may not be a betaine, having a molecular weight of between 200 and 10,000 and has been obtained by reaction of a $\beta$-lactone with a nucleophilic agent in a molar ratio of between 20:1 and 1:40.

It has now been found that improvements in this method of polymerization and in the properties of the polymer products may be obtained by employing an initiator of which at least 80% by weight has a particle size of between 5 and 200 microns, as may be apparent from the following Table I, which indicates the bulk density of the polymer products.

TABLE I

| Initiator: | Particle size of initiator | | | | Dusting of polymer product |
|---|---|---|---|---|---|
| | Unsieved | 177–350$\mu$ | 74–177$\mu$ | <74$\mu$ | |
| A | | | | 0.38 | 0 |
| A | | | 0.14 | | + |
| B | | 0.27 | | | 2 |
| B (milled) | | | | 0.42 | 1 |
| C | | | 0.27 | | 2 |
| C | | | | 0.33 | 1 |
| C | | | | 0.43 | 0 |
| D | | | | 0.41 | 1 |
| D | | | | 0.48 | 1 |

Note.—0=no dusting of the polymer product
1=some dusting
2=severe dusting
+=polymerization showed a long induction period, after which runaway polymerization started, resulting in a fluffy polymer product.

Initiator A, mol. weight 5800, was obtained by reacting at 35° C. equimolar amounts of tributylphosphine and pivalolactone in pentane (250 mmole of lactone in 250 ml. of pentane). Initiators B and C were prepared in a similar way, but had molecular weights of 11,000 and 7000, respectively. Initiator D, mol. weight 3400, was obtained by reacting at 30° C. tributylphosphine with pivalolactone in a molar ratio of 1:3 in ether (250 mmole of lactone in 250 ml. of ether). The prepolymer-initiators were sieved through ASTM sieves, the fraction having a particle size of between 177 and 350 microns passing a No. 45 sieve, but being retained by a No. 80 sieve, the 74–177 microns fraction passing the No. 80 sieve but being retained by a No. 200 sieve and the fraction having a particle size below 74 microns passing the No. 200 sieve. In one case the unsieved initiator B, in another case a sieve fraction of the milled initiator B and in the remaining cases the sieve fractions indicated were used to initiate a pivalolactone polymerization in hexane at 68° C. prepolymer concentration 0.25% w. (based on lactone), volume ratio lactone/hexane 1:2, polymerization time 8 hours (4 hours' addition time of lactone+4 hours' after-polymerization), polymer yield 100%.

It is clear from Table I that:
(a) The preferred high bulk density of the polymer product is advantageously obtained by employing initiators having predominantly, i.e., at least 80% w., a particle size of not more than 200 microns, and preferably not more than 100 microns. High bulk densities are, of course, generally desirable for storage, handling and processing of the polymer;
(b) Undesirable dusting is minimized by the use of initiators having lower particle sizes. However, if the initiator has too small a particle size, i.e. predominantly below 5–10 microns, the polymer product will again have an increased tendency to dusting. Consequently, it is desirable that more than 80% by weight of the initiator used should have a size larger than 5 microns, and preferably larger than 10 microns;
(c) The particle size of coarser initiators may be reduced by milling, hammering and similar means known in the art. The initiator thus obtained having a particle size between 5 and 200 microns is equally well suited to the process according to the invention. When disintegrating the initiator, e.g., by milling, care should be taken not to overheat it; in general the temperature should remain below 60–100° C. The maximum allowable temperature also depends upon the time during which the initiator is subjected to such temperatures, higher temperatures being tolerable for shorter times. Too long a time at too high a temperature may reduce initiating activity;

(d) With an initiator (B) having a molecular weight of about 10,000, the use of a special sieve fraction according to the invention still results in a useful initiating activity and bulk density. (As stated in copending U.S. patent application No. 717,394, filed Mar. 29, 1968, the activity of initiators having a molecular weight of much above 10,000, drops to an unattractively low level.) Thus, it has been found that in the process according to the invention initiators having molecular weights of more than 10,000 may also be used.

The present invention therefore relates to a process for the polymerization of one or more β-propiolactones, at least 50% mole thereof being pivalolactone, in a liquid hydrocarbon diluent having a boiling point of below 300° C. in the presence of a solid carboxylate anion-containing initiator which is substantially insoluble in the diluent, is free of active hydrogen and is selected from the group consisting of preformed betaines having a molecular weight of below 30,000 and "living" prepolymers having a molecular weight of between 200 and 30,000, which initiator has been obtained by reaction of a β-lactone with a nucleophilic agent in a molar ratio of between 20:1 and 1:40, at least 80% by weight of the initiator possessing a particle size of between 5 and 200 microns.

The polyester which is the product of the process according to the invention is a linear polymer having recurring ester structural units, mainly of the formula:

i.e., units derived from pivalolactone. Preferably the polyester is a pivalolactone homopolymer. The scope of the present invention, however, also includes copolymerization of pivalolactone with not more than 50% mole, preferably not more than 10% mole of other β-propiolactones, such as β-propiolactone, and alkyl substituted β-propiolactones wherein the alkyl group contains 1–4 carbon atoms, for example, α,α-diethyl-β-propiolactone and α-methyl-α-ethyl-β-propiolactone.

The liquid hydrocarbon diluent—or at least 90% by weight of its components—has a boiling point (at atmospheric pressure) of below 300° C., preferably between —50 and 200° C., and more preferably between 30 and 125° C. As used herein, "liquid" refers to the liquid state under the polymerization conditions. Preferred diluents are the saturated aliphatic and cycloaliphatic hydrocarbons such as pentane, heptane, cyclohexane, 1,4-dimethylcyclohexane, isooctane, aviation alkylate, and the like. The use of, for example, propane or butane will usually require super-atmospheric pressure.

The betaines may be regarded as inner salts having in the molecule a carboxylate anion: —C(O)O⁻ and a "nium" cation such as, for example, ammonium, pyridinium, morpholinium, phosphonium, arsonium, stibonium and sulphonium. Examples of suitable preformed initiators which are not prepolymers, are the inner salts of (carboxymethyl)trimethylammonium or ordinary betaine: (CH₃)₃N⁺CH₂COO⁻, (2 - carboxyethyl)pyridinium, (1-carboxyundecyl)trimethylammonium, (1-carboxyethyl)tributylphosphonium, (carboxymethyl)dimethylsulphonium and 3-carboxy-1-methylpyridinium.

The preferred polymerization initiators are the "living" prepolymers. These are solids substantially insoluble in the diluent, i.e., soluble to an amount which is in practice too small to be measurable, but which will in general be lower than 1% by weight. Their molecular weight is below 30,000, preferably between 1000 and 10,000.

The prepolymer initiators may or may not be betaines, dependent upon the type of nucleophilic agent used in the reaction with the β-lactone. If tertiary phosphines, stibines, arsines, amines or sulfides or sulfoxides are used as nucleophilic agent, then—upon reaction with a β-lactone—a betaine-type prepolymer will result. If, on the other hand, an alkali metal salt of an organic or inorganic acid, an alkali metal hydroxide, hydrosulfide, phenolate, thiophenolate, alcoholate or mercaptide, an alkali metal alkyl or aryl, a quaternary phosphonium, stibonium, arsonium, ammonium or a tertiary sulfonium salt of an organic or inorganic acid is used as nucleophilic agent, a prepolymer which is not a betaine may be formed. Prepolymer initiators which are betaines are preferred in view of the higher thermostability of the resulting polyesters.

Examples of suitable nucleophilic agents are lithium bromide, potassium iodide, sodium acetate, sodium stearate, potassium pivalate, sodium hydroxide, lithium hydrosulfide, potassium cresolate, dibutyl sulfide, dimethyl sulfioxide, trimethylsulfonium iodide, trimethylamine, tetramethylammonium laurate, tributylphosphine, triphenylarsine, methyldiethylstibine, tetrabutylphosphonium bromide, lithium butyl, sodium naphthalene and the like. Preferred nucleophilic agents are the tertiary phosphines, stibines, and arsines having the formula R₃'P, R₃'As or R₃'Sb wherein R' is an alkyl or aryl radical.

The β-lactone from which the prepolymer is preferably obtained has the formula:

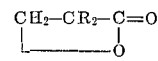

in which R represents hydrogen and/or an alkyl group having not more than 4 carbon atoms, e.g., β-propiolactone, α-methyl-α-ethyl-β-propiolactone, α,α-diethyl-β-propiolactone. A preferred β-lactone is pivalolactone.

In order to obtain the prepolymer initiator, the β-lactone and nucleophilic agent are reacted in a molar ratio of between 20:1 and 1:40, preferably between 10:1 and 1:10. Advantageously the lactone is added to the nucleophilic agent so as to ensure that at any time during the reaction the molar ratio will not be too high. This reaction is suitably carried out in a liquid inert diluent, although gaseous diluents may be used if desired, e.g. in a fluid-bed-type reactor. Water and other protic solvents such as alcohols, phenols, acids and the like are undesirable, although minor amounts of water or alcohols, e.g. up to 5% weight, may be tolerated in the reaction mixture. Suitable diluents are, for example, hydrocarbons, ethers, esters and halogenated hydrocarbons. It should be remembered, however, that strongly basic nucleophilic agents such as NaOH, may not be inert towards esters and halogenated hydrocarbons. Preferred diluents are the hydrocarbons boiling below 300° C. at atmospheric pressure, in particular the same hydrocarbon to be used in the polymerization. Suitable temperatures for the reaction between the β-lactone and nucleophilic agent are between 0 and 200° C., preferably between 10 and 70° C. During the reaction the reaction mixture is stirred, the stirring energy preferably being at least 300 watts per cubic meter of reactor volume.

The prepolymer will precipitate from the liquid diluent after some time, usually in the form of a fine powder.

It is necessary to allow the reaction mixture to stand for at least 5–60 minutes, preferably at least 200 minutes, after the addition of the reaction components so as to allow the prepolymer to precipitate substantially completely. The reaction mixture should be stirred during this period preferably at least 200 minutes, after the addition of the reaction components so as to allow the prepolymer to precipitate substantially completely. The reaction mixture should be stirred during this period preferably under the same stirring conditions mentioned hereinabove. If in certain solvents such as esters and ketones, the solubility of the prepolymer is too high, precipitation may be promoted by addition of liquid hydrocarbons. Thereupon the prepolymer is preferably separated, e.g. by filtration or centrifugation, and may subsequently be washed, if desired, e.g. with a volatile solvent such as pentane. Washing is more desirable if the prepolymer is not a betaine. A prepolymer of desired particle size may be obtained by sieving. The prepolymer need not be separated from the reaction mixture, however; said mixture may also be used as such after being allowed to stand for at least 5 minutes, in particular in connection with the following modification of the invention.

It has been found that increased yields of prepolymers having at least 80% by weight of particles of not more than 200 microns may be obtained if the reaction between the $\beta$-lactone and the nucleophilic agent is effected in a liquid diluent in the presence of a surface-active substance consisting of an organic compound having a hydrocarbon chain with a molecular weight of at least 200 in particular of at least 800 and having one or more alcoholic hydroxyl, amino, carbon amido or imido groups, as may be apparent from the examples hereinbelow. The carbon amido group may also occur in a cyclic structure, such as in lactams. The amino groups may be primary, secondary or tertiary. Examples of surface-active substances which may be employed according to the invention are:

(a) N-(trimethylolmethyl)-polyisobutenylsuccinimide, in which the polyisobutenyl radical may have a molecular weight of from 800 to 1000. This substance may be obtained, for example, by causing polyisobutenylsuccinic anhydride to react with trimethylolmethylamine;

(b) The reaction product of polyisobutenylsuccinic anhydride and pentaerythritol, in which the polyisobutenyl radical has a molecular weight of from 800 to 1000 and which probably contains two free hydroxyl groups per molecule;

(c) A polyisobutenylsuccinimide of which the polyisobutenyl radical has a molecular weight of from 800 to 1000 and which may be obtained by reaction of polyisobutenyl succinic anhydride with tetraethylenepentamine.

(d) A copolymer of N-vinylpyrrolidone and laurylmethacrylate (molar ratio in the copolymer about 1/4) having a molecular weight of around 800,000;

(e) Copolymers of $\alpha$-olefins having at least 8, preferably at least 10 carbon atoms, such as tetradecene-1, and vinyl compounds containing as a substituent one of the eligible polar groups such as, for example, vinyl alcohol (via vinyl acetate).

(f) Aliphatic polyamines obtained by alkylating tetraethylenepentamine with polyisobutenylchloride as described in U.S. 3,275,554.

Excellent results have been obtained with derivatives of alkyl and alkenylsuccinic anhydride of which the alk(en)yl group has a molecular weight of between 500 and 10,000, in particular with imide derivatives. The alkenyl group is preferably a polyalkenyl radical, in particular a polyisobutenyl radical.

Another group of suitable surface-active agents with which good results have been obtained is formed by the copolymers of alkylmethacrylates with a copolymer component having one or more alcoholic hydroxyl, amino, carbon amido or imido groups. The alkyl methacrylates usually have an alkyl group with at least 8 and preferably with from 10 to 20 carbon atoms, such as in n-dodecyl methacrylate. The molar ratio of alkyl methacrylate to copolymer components in the surface-active agent is usually of from 95/5 to 75/25 and preferably of from 93/7 to 85/15. Suitable copolymer components are, for example, aminoalkyl methacrylates such as diethylaminoethyl methacrylate; hydroxylalkyl methacrylates such as hydroxyethoxyethyl methacrylate; vinylpyridines such as 5-ethyl-2-vinylpyridine; N-vinylpyrrolidone and vinyldiethylaminoethyl ether. The molecular weights of the copolymers are generally above 10,000, preferably between 50,000 and 500,000.

The surface-active substance is generally employed in a weight quantity of from .01 to 5%, preferably of from 0.2 to 2%, calculated on the volume of the liquid diluent used in the preparation of the prepolymer.

The amount of carboxylate anion-containing initiator to be used in the polymerization according to the invention is generally between 0.01 and 10% by weight, preferably between 0.1 and 2% by weight, based on monomers. The temperature at which polymerization takes place will mostly be between 0 and 150° C., preferably between 60 and 100° C. The weight ratio of monomer to hydrocarbon diluent may be as high as 1 and is preferably from 0.2 to 0.8.

The polyesters obtained according to the invention are suitable for numerous applications, such as the manufacture of threads, fibers and films and molded articles such as buttons, lamp bases, toys and the like.

EXAMPLES

A number of prepolymers were prepared by reacting pivalolactone and tributylphosphine in a molar ratio of 3:1 at a temperature of 35–36° C. in various solvents, with or without a surface-active substance. In each case 250 ml. of solvent were used. The phosphine was dissolved therein after which 75 g. of pivalolactone was added at a rate of 2 g./minute while stirring. After the addition the mixture was kept at 35–36° C. for 5 hours, whereup the prepolymer was filtered, washed with pentane and dried. The particle size distribution of the prepolymer was determined by sieving. The following surface-active substances were used:

(a) A copolymer of N-vinyl pyrrolidone and laurylmethacrylate (molar ratio in the copolymer about 1/4) having a molecular weight of around 800,000 (NVPLM); (b) the reaction product of polyisobutenyl succinic anhydride with tetraethylenepentamine having an average molecular weight of 1270 (PISATEP); and (c) sorbitan mono-oleate (SM).

The results of the prepolymer preparation are listed in the following Table II.

TABLE II

| Example: | Solvent | Surface-active substance | Stirring speed, r.p.m. | Molecular weight | Prepolymer sieve fractions, percent wt. | | |
|---|---|---|---|---|---|---|---|
| | | | | | $<74\mu$ | $74$–$177\mu$ | Total $<177\mu$ |
| 1 | Ether | | 550 | 3,500 | 41 | 13 | 54 |
| 2 | Pentane | | 550 | 7,700 | 10 | 51 | 61 |
| 3 | DME | | 550 | 2,740 | 36 | 20 | 56 |
| 4 | Ether | 1% [1] NVPLM | 550 | 7,500 | 90 | 9 | 99 |
| 5 | do | 0.1% NVPLM | 550 | 6,000 | 7 | 37 | 44 |
| 6 | do | 0.5% NVPLM | 550 | 9,400 | 37 | 57 | 94 |
| 7 | Pentane | 0.5% NVPLM | 550 | 22,000 | 3 | 95 | 98 |
| 8 | do | 1% PISATEP | 550 | [2] | 12 | 84 | 96 |
| 9 | do | 0.5% PISATEP | 550 | 4,400 | 11 | 87 | 98 |
| 10 | do | 0.5% PISATEP | 250 | [2] | 1 | 52 | 53 |
| 11 | do | 0.5% PISATEP | 1100 | [2] | 9 | 90 | 99 |
| 12 | do | 0.5% SM | 550 | [2] | 4 | 76 | 80 |

[1] Calculated on the weight of the solvent.
[2] Not determined.

NOTE.—DME=dimethoxyethane.

It appears from these results that:

(a) The presence of a surface-active substance during the preparation of the prepolymer greatly increases the yield of prepolymer having the desired particle size;

(b) The stirring speed influences the yield of prepolymers of desired particle size. Under the particular conditions of the above experiments the minimum stirring speed would appear to be 350–400 r.p.m;

(c) In polar solvents there is a tendency to the formation of prepolymers having smaller particle sizes than in non-polar solvents;

(d) The molecular weight of the prepolymer is in general higher when the prepolymer is prepared in a non-polar solvent than when it is prepared in a polar solvent;

(e) Sorbitan monooleate is a less suitable surface-active substance probably due to insufficient oleophilic nature.

A number of the sieve fractions obtained were used in an amount of 0.5% w., based on pivalolactone, to initiate the polymerization of said lactone in hexane (50 g. of lactone/100 ml. of hexane) at 68° C. The lactone was added in 4 hours while stirring the mixture of hexane and prepolymer. After completion of the addition the mixture was stirred for another 2–3 hours at 68° C. The polypivalolactone was filtered, washed with hexane and the limiting viscosity number in benzyl alcohol was determined at 150° C. Limiting viscosity number is a measure of molecular weight and increases as molecular weight increases. The results are listed in the following Table III.

TABLE III

| Prepolymer of Example: | Sieve fraction | Limiting viscosity number, dl./g. | Bulk density g./ml. |
|---|---|---|---|
| 1 | A/B | 2.57/3.44 | +/+ |
| 2 | A | 3.63 | + |
| 4 | A/B | 1.96/4.42 | +/+ |
| 5 | A/B | 4.90/5.80 | 0.48/0.42 |
| 6 | A/B | 1.60/2.75 | 0.40/0.5₂ |
| 7 | B | 9.10 | 0.3₃ |
| 9 | B | 7.10 | 0.5₃ |
| 11 | B | 6.0 | 0.5² |

NOTE.—A = <74 microns; B = 74–177 microns; + = Not determined.

In the following examples it is shown that the particle size of the initiator may also be influenced by the ratio of lactone to nucleophilic agent. Tributyl phosphine and pivalolactone were refluxed for 5 hours in pentane at a stirring speed of 1150 r.p.m. The lactone concentration was 29% vol. (based on pentane+lactone), the molar ratio between tributyl phosphine and lactone is indicated in the following Table IV.

TABLE IV

| Example: | Phosphine/ lactone molar ratio | Mol. weight of prepolymer | Sieve fractions, percent by weight <74μ | 74–177μ |
|---|---|---|---|---|
| 13 | 1/3.7 | 3,040 | 5 | 93.3 |
| 14 | 1/3.7 | 4,920 | 20.7 | 78.2 |
| 15 | 1/7.4 | 7,045 | 95.0 | 4.9 |
| 16 | 1/20.5 | 15,900 | 98.2 | 1.6 |

It will be noted that upon lowering of the phosphine/lactone ratio, the particle size of the prepolymer shifts to lower values. A desirable distribution of prepolymer particle sizes under these conditions may be obtained when employing tributyl phosphine/pivalolactone molar ratios between 1:2 and 1:10.

The prepolymer, of Example 15, was used in an amount of 0.5% w. to polymerize pivalolactone in hexane (33% w./v. of lactone) at 69° C. The lactone was added in 1 hour after which the reaction was continued for another 3 hours. The yield of polymer was quantitative, the limiting viscosity number 4.47 dl./g. and the bulk density 0.44.

What I claim is:

1. A process for the polymerization of one or more betapropiolactones, at least 50 mole percent thereof being pivalolactone, in a liquid hydrocarbon diluent having a boiling point below 300° C. in the presence of a solid carboxylate anion-containing initiator prepolymer which is substantially insoluble in the diluent, is free of active hydrogen, has a molecular weight below 30,000 and is prepared by reacting a beta-lactone with a nucleophilic agent in the presence of a surface active substance comprising an organic compound having a hydrocarbon chain with a molecular weight of at least 200 and having one or more alcoholic hydroxyl, amino, carbon amido or imido groups, said nucleophilic agent being selected from the group consisting of tertiary phosphines, stibines and arsines of the general formula $R_3'P$, $R_3'As$ or $R_3'Sb$ wherein $R'$ is an alkyl or aryl radical, in the mole ratio of beta-lactone to nucleophilic agent of between 10:1 and 1:10, said prepolymer initiator having at least 80% by weight of a particle size between 5 and 200 microns.

2. A process as claimed in claim 1, in which the surface-active substance used is an alkyl or alkenylsuccinic anhydride derivative of which the alk(en)yl group has a molecular weight of between 500 and 10,000.

3. A process as claimed in claim 1, in which pivalolactone is homopolymerized.

4. A process as claimed in claim 1, in which the weight ratio of monomer to hydrocarbon diluent is from 0.2 to 0.8.

References Cited

FOREIGN PATENTS

| 736,566 | 6/1966 | Canada | 260—78.3 |
| 1,231,163 | 9/1960 | France | 260—78.3 |
| 1,016,394 | 1/1966 | Great Britain | 260—78.3 |

OTHER REFERENCES

Chemical Abstracts 61, 9586d (1964).

WILLIAM H. SHORT, Primary Examiner

E. H. NIELSEN, Assistant Examiner

U.S. Cl. X.R.

260—823